J. C. RUMMER.
COMBINATION TIRE TOOL AND LIFTING JACK.
APPLICATION FILED JULY 24, 1918.
1,325,414. Patented Dec. 16, 1919.
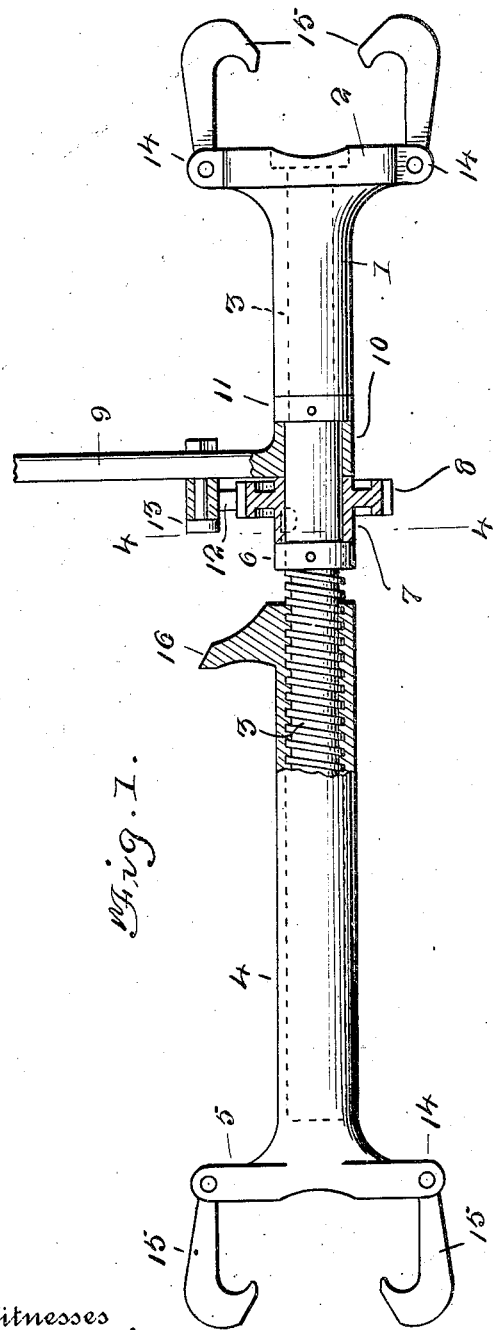
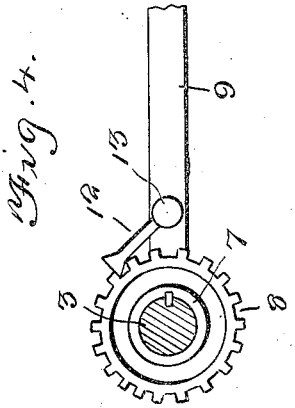
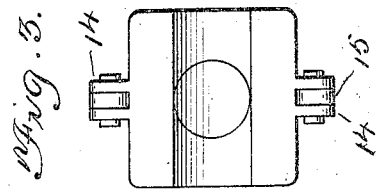
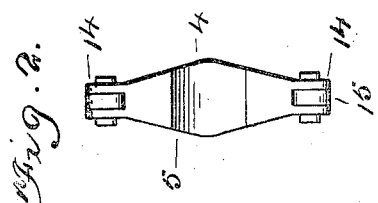
Inventor
J. C. Rummer
By Victor J. Evans
Attorney
Witnesses
E. R. Ruppert
L. B. Middleton

UNITED STATES PATENT OFFICE.

JOHN C. RUMMER, OF FLEMINGTON, PENNSYLVANIA.

COMBINATION TIRE-TOOL AND LIFTING-JACK.

1,325,414.  Specification of Letters Patent.  Patented Dec. 16, 1919.

Application filed July 24, 1918. Serial No. 246,503.

*To all whom it may concern:*

Be it known that I, JOHN C. RUMMER, a citizen of the United States, residing at Flemington, in the county of Clinton and State of Pennsylvania, have invented new and useful Improvements in Combination Tire-Tools and Lifting-Jacks, of which the following is a specification.

This invention relates to new and useful improvements in tools and the principal object of the invention is to provide a combined tire tool and lifting jack.

Another object of the invention is to provide a jack provided with pivoted jaws at each end thereof for engaging the rim of the tire.

Another object of the invention is to provide a device of this character which is simple and durable in construction, reliable and efficient in operation, and one which can be manufactured and placed upon the market at a minimum cost.

The invention also consists in certain other features of construction and in the combination and arrangement of the several parts, to be hereinafter fully described, illustrated in the accompanying drawings, and specifically pointed out in the appended claim.

In describing my invention in detail, reference will be had to the accompanying drawings wherein like characters denote like or corresponding parts throughout the several views, and in which:—

Figure 1 is an elevation of the tool with parts broken away,

Fig. 2 is a view of one end of the device,

Fig. 3 is a view of the other end of the device, and

Fig. 4 is a cross-section on line 4—4 of Fig. 1.

As shown in these views the device comprises the base member 1 having the rectangular base 2 and provided with a central opening through which the worm member 3 passes. 4 is the top member provided with the elongated head 5 and having a screw-threaded bore for receiving the worm member 3.

The worm member 3 is provided with a collar 6 against which abuts the hub 7 of the toothed wheel 8 which is suitably connected as by a spline with the worm member 3. A hand lever 9 is connected with a ring 10 which loosely surrounds the smooth part of the worm member 3 and said ring is held between the wheel 8 and a collar 11 carried by the member 3. A double-headed dog 12 is pivoted to the handle 9 by means of the bolt 13 and is adapted to engage with the wheel 8 so that the said wheel may be rotated in opposite directions by reversing the position of the dog on the handle. The base 2 and the head 5 are each provided with a pair of ears 14 at each end thereof, between which are pivoted jaws or hooks 15 which are adapted to engage the edges of the ordinary split rim of a tire so that the same may be contracted by operating the jack to move the parts thereof toward each other.

If it is desired to expand the rim, opposite parts thereof are engaged by the base 2 and head 5 of the jack, and the handle is moved to force said parts away from each other and thus expand the rim.

The part 4 of the jack is provided with a foot 16 so that the jack may be used as an ordinary lifting-jack. In this case the hooks or jaws may be swung inwardly or said parts may be removed. Of course, if desired, the head 5 may engage the part to be lifted instead of the foot 16.

It is thought from the foregoing description that the advantages and novel features of my invention will be readily apparent.

I desire it to be understood that I may make changes in the construction and in the combination and arrangement of the several parts, provided such changes fall within the scope of the appended claim.

What I claim is:—

A device of the class described, comprising a base part having an enlarged base and a plain bore, a movable part having an elongated head and a screw-threaded bore, a foot on the inner end of said movable part, a worm member passing through the bore in the base part and engaging said screw-threaded bore of the movable part, a toothed wheel secured to said worm member, a collar on said member butting the wheel, a handle having a ring portion loosely engaging said worm member between the wheel and the end of the base part, a dog pivoted to said handle and engaging said wheel and pivoted jaws on said base and head.

In testimony whereof I affix my signature.

JOHN C. RUMMER.